United States Patent
Thapa

(10) Patent No.: US 8,209,287 B2
(45) Date of Patent: Jun. 26, 2012

(54) ENERGY EFFICIENT BACKUP SYSTEM AND METHOD

(75) Inventor: Sarad Thapa, Commack, NY (US)

(73) Assignee: CA, Inc., Islandia, NY (US)

( * ) Notice: Subject to any disclaimer, the term of this patent is extended or adjusted under 35 U.S.C. 154(b) by 284 days.

(21) Appl. No.: 12/268,537

(22) Filed: Nov. 11, 2008

(65) Prior Publication Data

US 2010/0121820 A1 May 13, 2010

(51) Int. Cl.
*G06F 17/30* (2006.01)
*G06F 17/00* (2006.01)

(52) U.S. Cl. ........ 707/636; 707/640; 709/218; 711/162; 713/300

(58) Field of Classification Search .................. 707/636, 707/640; 709/218, 203, 213, 214, 215; 711/162; 713/300, 340
See application file for complete search history.

(56) References Cited

U.S. PATENT DOCUMENTS

| | | | |
|---|---|---|---|
| 5,801,894 A | 9/1998 | Boutaghou et al. | |
| 6,747,933 B2 | 6/2004 | Ueki | |
| 7,275,166 B2 | 9/2007 | Kaiju et al. | |
| 7,360,045 B2* | 4/2008 | Maezawa | 711/162 |
| 7,369,566 B2 | 5/2008 | Deczky | |
| 7,389,431 B2 | 6/2008 | Ohara | |
| 7,395,452 B2 | 7/2008 | Nicholson et al. | |
| 7,584,266 B2* | 9/2009 | Mastrianni et al. | 709/218 |
| 2006/0174144 A1 | 8/2006 | Kim et al. | |
| 2006/0187866 A1 | 8/2006 | Werb et al. | |
| 2006/0259795 A1* | 11/2006 | Tsai et al. | 713/300 |
| 2007/0140691 A1 | 6/2007 | Gao et al. | |
| 2008/0082752 A1 | 4/2008 | Chary et al. | |

OTHER PUBLICATIONS

Brodkin, John, "EMC upgrades backup portfolio, unveils power saving technology, "Spin down" automatically puts idle drives into sleep mode", *Network World*, http://www.networkworld.com/news/2008/051908-emc-world-products.html, (May 19, 2008).

* cited by examiner

*Primary Examiner* — Yicun Wu
(74) *Attorney, Agent, or Firm* — Schwegman, Lundberg & Woessner, P.A.

(57) ABSTRACT

A computer implemented method of backing up files includes initiating a backup process and waking up a client machine from a low power consumption mode. An indication from the client machine that the client machine is ready is received and the client machine is instructed to provide data to be backed up. An end of backup notification is received from the client machine and the client machine returns to a low power consumption mode.

20 Claims, 2 Drawing Sheets

ENERGY EFFICIENT BACKUP SYSTEM AND METHOD

BACKGROUND

Traditional methods of backing up data on client computers require the client computer to remain powered up in order to be included in backup jobs run by servers. Servers would simply copy data to be backed up from client computers coupled to it by network.

SUMMARY

A computer implemented method of backing up files includes initiating a backup process and waking up a client machine from a low power consumption mode. An indication from the client machine that the client machine is ready is received and the client machine is instructed to provide data to be backed up. An end of backup notification is received from the client machine and the client machine returns to a low power consumption mode. In one embodiment, a computer readable medium stores executable instructions to cause a computer to execute the above method.

A system for backing up files includes multiple client machines coupled to a network. A server initiates a backup process and sends probes to the client machines to wake up the multiple client machines from low power consumption modes and receives streamed backup data from the multiple client machines. A storage system receives and stores the streamed backup data to create a backup copy of the client machines. Each client machine includes an agent that monitors the network for probes, wakes up the client machine upon receipt of the probe, runs a backup job on the client, streams backup data onto the network, and places the client back in a lower power consumption mode when finished with the backup job.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method of backing up data on client computers coupled to a network is initiated by a server. A network adapter on the client computer wakes up the client computer for the backup, allowing the client computer to be in an energy conserving mode, such as standby. A set of communications between the client and server indicate to the server when the client is ready, and also place the client back in a power conserving mode when the backup is complete.

Figure 1:
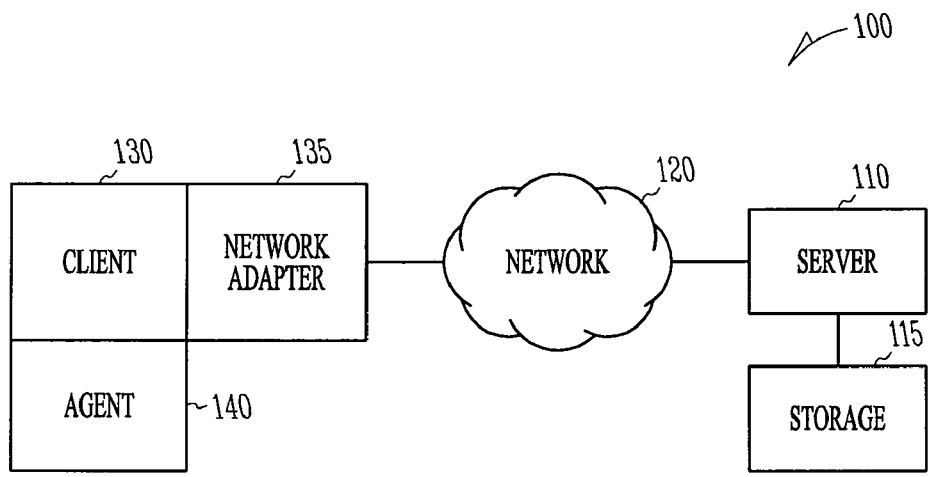
FIG. 1 is a block diagram of a client and server coupled to a network for backing up the client according to an example embodiment.

FIG. 1 is a block diagram of system 100 for backing up data. A server 110 has a storage device 115, and is coupled via a network 120 to one or more client computers 130. Server 110 in one embodiment is a computer system that facilitates saving backup copies of networked client computers 130. Storage device 115 may take many forms, such as an array of disk devices, such as RAID systems, or tape library systems capable of storing significant amounts of data. In further embodiments, storage device 115 may be formed of one or more network storage devices. In one embodiment, network 120 may be the Internet, or one of various private networks if desired.

Client computer 130 in one embodiment is coupled to the network 120 via a network adapter 135. Network adapter 135 serves to detect network activity, such as probes, and wake up client computer 130 upon such detection. In one embodiment, such a network adapter is referred to as supporting "Wake on LAN" (WoL) and are may be ethernet network adapters embedded on a system board of a computer. In some embodiments, (WoL) may be enabled in the BIOS settings of the computer. Once the feature is enabled, while the computer is in a low-powered state, a network port is active and is scanning the packet headers it receives. Once it receives a predetermined wake up packet, the network card then powers up the machine in response.

In some embodiments, wake up packet is a broadcast frame containing anywhere within its payload 6 bytes of ones (resulting in hexadecimal FF FF FF FF FF FF) followed by sixteen repetitions of the target computer's MAC address. Older stand-alone network adapters may also support WoL. Some stand-alone cards may receive an extra WAKEUP-LINK header on the motherboard that connects to the network card and supplies power to enable WoL on the card.

In one embodiment, an agent 140 comprises a software module that executes on the client computer 130 to provide a stream of backup data to server 110 via network 120.

Figure 2:
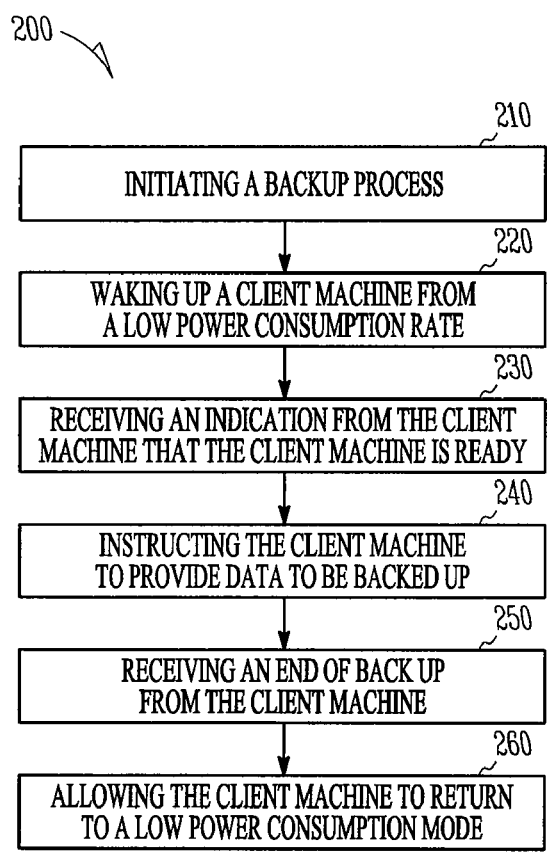
FIG. 2 is a block diagram illustrating a method of backing up data on a client computer to a server according to an example embodiment.

FIG. 2 is a block diagram illustrating a method 200 of backing up data on a client computer to a server according to an example embodiment. At 210, the server 110 initiates a backup process. The server 110 sends a communication, such as a probe to the client computer 130. In one embodiment, the probe is a TCP/IP packet targeted at the IP address of the client computer 130. The network adapter 135 detects the probe, and wakes up the client computer 130 or machine from a low power consumption mode. The server 110 then receives an indication from the client computer 130 that the client computer 130 is ready to receive a job to perform.

The server 110 instructs the client computer 130 to provide data to be backed up via network 120. In one embodiment, agent 140 executes, and determines data to be backed up and provides a stream of such data to network 120. The server 110 receives the stream of data to be backed up, and when complete, receives an end of backup from the client computer 130. The client computer 130 is then allowed to return to the low power consumption mode. In one embodiment, the agent 140 places the client computer 130 into the low power consumption mode, such as a sleep mode or standby mode.

In one embodiment, the server 110 initiates the backup of multiple client computers at a convenient time, such as late at night or early morning, sequencing through the client computers in a manner consistent with network and data storage capabilities. Several client computers may be executing backup agents at the same time in one embodiment, streaming data to the server 110, or to multiple servers or directly to one or more storage devices coupled to the network. Thus, given sufficient network bandwidth and storage device data storage rates, large networks of client devices may be backed up in a desired amount of time. Groups of client computers may be waked up at staggered times to accomplish the desired backup of a network of client computers.

Figure 3:
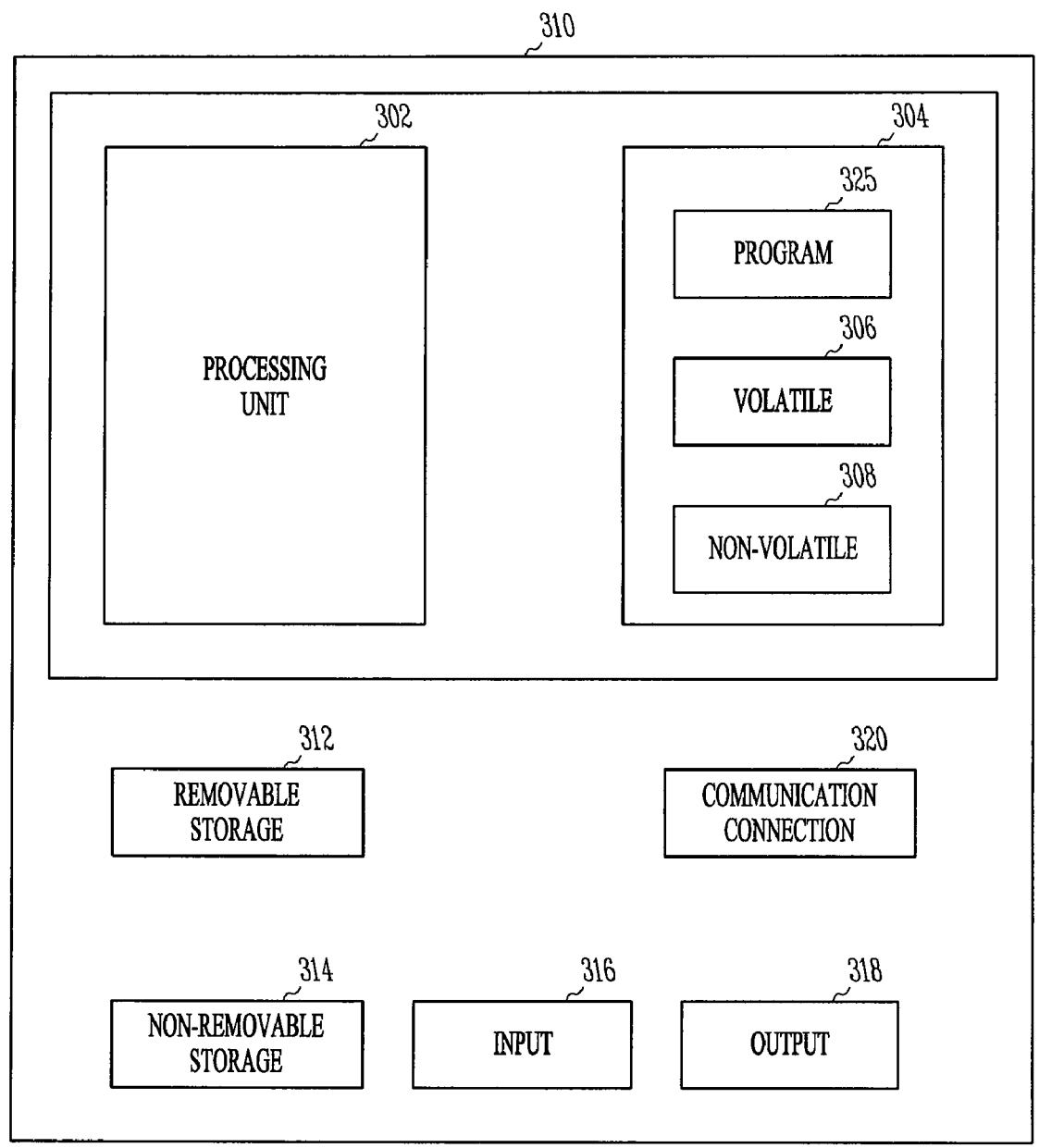
FIG. 3 is a block diagram of a computer system for implementing backup methods according to an example embodiment.

FIG. 3 is a block diagram of a computer system that executes programming for performing the above backup methods. A general computing device in the form of a computer 310, may include a processing unit 302, memory 304, removable storage 312, and non-removable storage 314. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method of backing up files, the method comprising:

initiating a backup process via a network coupled server;

waking up a client computer from a low power consumption mode using a communication from the network coupled server;

receiving, at the network coupled server, an indication from the client computer that the client computer is ready to provide backup data;

instructing, from the network coupled server, the client computer to provide data to be backed up;

receiving, at the network coupled server, an end of backup notification from the client computer; and allowing the client computer to return to the low power consumption mode.

2. The method of claim 1 wherein the low power consumption mode is a sleep mode.

3. The method of claim 1 wherein allowing the client computer to return to the low power consumption mode comprises instructing the client computer to return to the low power consumption mode.

4. The method of claim 1 wherein instructing the client computer to provide data to be backed up comprises initiating a backup agent within the client computer.

5. The method of claim 4 wherein the data to be backed up is received from the client computer via, a network.

6. The method of claim 5 wherein the data to backed up is received as a stream of data.

7. The method of claim 4 wherein the backup agent puts the client computer into the low power consumption mode.

8. The method of claim 7 wherein the low power consumption mode comprises a standby mode.

9. The method of claim 1 wherein waking up the client computer comprises contacting a network adapter of the client computer that causes the client computer to wake up upon detecting network activity.

10. The method of claim 9 wherein contacting the network adapter comprises sending a network probe to the network adapter.

11. The method of claim 1 and further comprising repeating the method for multiple client computers.

12. The method of claim 11 wherein a first group of client computers is backed up at the same time, followed by backing up additional groups of client computers.

13. A computer readable medium having instructions stored thereon for execution by a computer of a method of backing up files, the method comprising:

initiating a backup process via a network coupled server;

waking up a client computer from a low power consumption mode using a communication from the network coupled server;

receiving an indication, at the network coupled server, from the client computer that the client computer is ready to provide data to be backed up;

instructing, from the network coupled server, the client computer to provide data to be backed up;

receiving, at the network coupled server, an end of backup notification from the client computer; and allowing the client computer to return to the low power consumption mode.

14. The computer readable medium of claim 13 wherein the low power consumption mode is a sleep mode or standby mode.

15. The computer readable medium of claim 13 wherein instructing the client computer to provide data to be backed up comprises initiating a backup agent within the client computer and wherein the data to be backed up is received as a stream of data from the client computer via a network.

16. The computer readable medium of claim 13 wherein waking up the client computer comprises sending a network probe to a network adapter of the client computer that causes the client computer to wake up upon detecting network activity.

17. The computer readable medium of claim 13 wherein the method further comprises repeating the method for multiple client computers in groups.

18. A system for backing up files, the system comprising:

multiple client computers coupled to a network;

a server that initiates a backup process and sends probes to the client computers to wake up the multiple client computers from low power consumption modes and receive streamed backup data from the multiple client computers;

a storage system that receives and stores the streamed backup data to create a backup copy of the client computers;

wherein each client computer comprises an agent that monitors the network for probes, wakes up the client computer upon receipt of the probe, runs a backup job on the client computer, streams backup data onto the network, and places the client computer back in the lower power consumption mode when finished with the backup job.

19. The system of claim 18 wherein each client computer comprises a network adapter that wakes up the client computer on detection of a network probe.

20. The system of claim 18 wherein the storage system comprises one or more network storage devices.

* * * * *